United States Patent Office 3,236,780
Patented Feb. 22, 1966

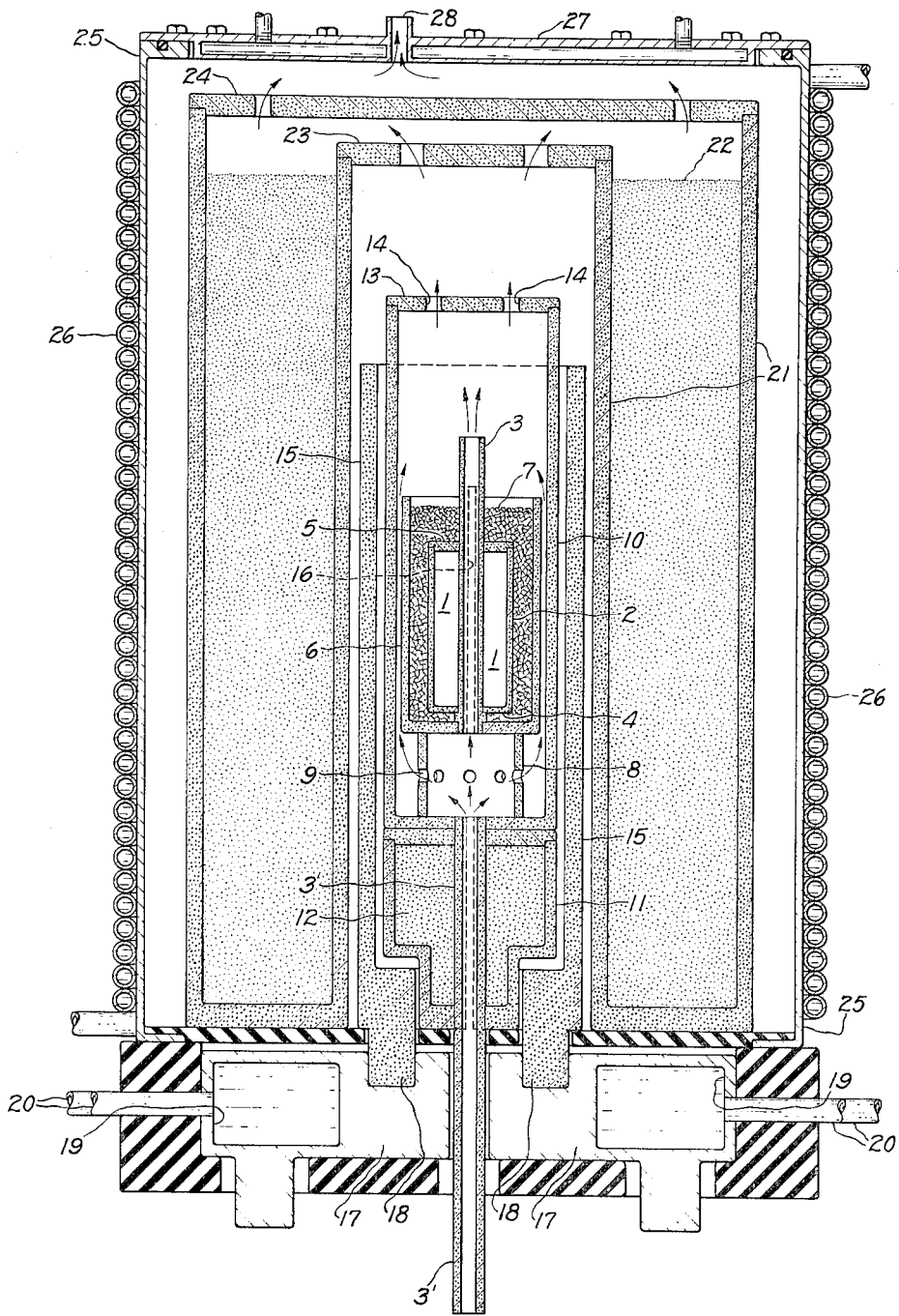

3,236,780
LUMINESCENT SILICON CARBIDE AND
PREPARATION THEREOF
Vernon Ozarow, University Heights, Ohio, assignor to
General Electric Company, a corporation of New York
Filed Dec. 19, 1962, Ser. No. 245,699
3 Claims. (Cl. 252—301.4)

The invention relates to the production of silicon carbide crystals and particularly to the production of such crystals having photoluminescent and/or electroluminescent properties.

Silicon carbide is a stable high temperature material of large band-gap in which considerable interest has arisen in the past few years. The most useful semiconductor materials to date have been the elements germanium and silicon; however they are both relatively low temperature materials, and even silicon semiconductors cannot be operated effectively at temperatures in excess of 200° C. Silicon carbide avoids these limitations. In the field of phosphors, silicon carbide also offers high temperature advantages over the materials so far used.

The object of the invention is to provide an improved method and apparatus for preparing carbide crystals. A feature of my invention is that it results in silicon carbide crystals having photoluminescent or electroluminescent properties at room temperature. Other features and objects will appear from the detailed description of the invention to follow.

The photoluminescence of alpha silicon carbide at liquid nitrogen temperatures is discussed by A. Lely and F. A. Kroger in "Optical Properties of Pure and Doped Silicon Carbide," Semiconductors and Phosphors, page 514 (Interscience, New York, 1958), and more recently by L. Patrick and W. J. Choyke, "Impurity Bands and Electroluminescence in Silicon Carbide P-N Junctions," Proceedings of the Conference on Silicon Carbide at Boston, Mass., April 2–3, 1959, page 281 (Pergamon Press, 1960). These workers have reported photoluminescence at liquid nitrogen temperatures only; they have reported room temperature photoluminescence as being very weak or absent.

In crystals prepared by my process, I have discovered appreciable room temperature luminescence under 3650. A. ultraviolet excitation in alpha silicon carbide. I estimate a quantum efficiency at room temperature of about 1 percent for the crystals which we have investigated. The only other estimate of photoluminescence quantum efficiency available for silicon carbide is by Patrick and Choyke, and it is also of the order of 1 percent; however, they apparently found this efficiency only at liquid nitrogen temperatures.

The preparation of the silicon carbide crystals in accordance with my invention was done in a carbon tube furnace at temperatures in the range of 2400 to 2600° C. in an atmosphere of flowing argon gas which acted as a carrier for the impurities used in doping the crystals. The presence of impurities in the crystals produces electrical conductivity, namely n-conductivity with elements of valency exceeding 4, such as for example the Group V–A elements nitrogen, phosphorus, arsenic and antimony which act as donors, and p-conductivity with elements of valency less than 4, such as for example the Group III–A elements boron and aluminum which act as acceptors. Other inert rare gases than argon may be used for the protective gas atmosphere but argon is in general preferred because it is the cheapest. For a donor impurity, nitrogen is preferred, added to the inert gas. For an acceptor impurity, boron trichloride, $BCl_3$, a volatile chloride of boron, is preferred.

The crystals are grown by a sublimation technique involving diffusion of the silicon carbide charge into an empty porous carbon or graphite chamber through its walls and diffusion of the doping agents through the walls of a central graphite channel passing through the cylinder. The diffusion of silicon carbide towards the center of the furnace is facilitated by the presence of a radial temperature gradient, that is the temperature is higher on the outside of the furnace than at the center of the furnace.

For further objects and advantages and for a better understanding of the invention, attention is now directed to the following description and accompanying drawing. The single figure of the drawing is a cross-section through a furnace used in practicing a preferred process for the preparation of photoluminescent or electroluminescent silicon carbide according to the invention.

The furnace is an electric graphite tube furnace, generally cylindrical in configuration. The heart of the furnace is an annular chamber 1 which is defined by a generally cylindrical graphite cup 2 through which extends a graphite pipe 3 having an expanded shoulder near its lower end on which rests the bottom wall 4 of the cup. A graphite disk 5 closes the cup and provides its top wall. The graphite pipe 3 constitutes the inner wall of the annular chamber in which the silicon carbide phosphor will form.

The annular chamber is encompassed by a graphite crucible 6 and the space between them is filled with the raw silicon carbide grains or powder 7. The silicon carbide powder completely surrounds the annular chamber including its cover over which it is heaped. Although the silicon carbide is referred to as "raw," it is desirable to use the purest silicon carbide available, such generally being light green in color; it is raw in the sense of being the raw material from which the phosphor is formed. One may also use a mixture of pure carbon and silicon. The crucible 6 rests on a graphite ring 8 to which inert gas is directed through a lower graphite pipe section 3'. Part of the inert gas flows through pipe section 3 extending through cup 2, and part flows through radial holes 9 in the ring and up around the outside crucible 6. Thus the entire assembly at the center of the furnace is immersed in inert gas, the general direction of the gas flow being indicated by the curving arrows. The assembly is surrounded by a larger graphite cup 10 whose bottom end rests on a graphite insulating member 11 filled with soot 12. The upper end of graphite cup 10 is closed by one or more graphite disks constituting a heat shield; only one disk 13 is illustrated. The disk has apertures 14 therethrough to allow the outflow of gases, principally inert gas ducted into the furnace through the pipe 3.

The heating element proper is a graphite tube 15 which serves as an electrical resistance; it is open at both ends and has a pair of diametrical slots 16 extending from the bottom vertically upwards for the major part of its length and splitting the tube lengthwise. Copper electrodes 17 are provided for conducting current to the split lower ends 18 of the furnace tube. The electrodes have cooling cavities 19 through which water is circulated by means of tubes 20. If a higher resistance heating element is desirable in order to accommodate the power supply, multiple vertical slots in the graphite furnace tube may be used. The graphite cup 10 makes for more uniform heating of the crucible 6.

The assembly is surrounded by a double walled graphite insulating jacket 21 filled with soot 22 and closed by covers 23, 24 having apertures therethrough to permit the escape of gases. Finally the insulating jacket is surrounded by a protective steel tank 25 whose vertical walls are lined by cooling water tubes 26. The top 27 is double-walled and cooling water is also circulated therethrough. A pipe 28 through the top vents escaping gases to the atmosphere.

In typical practice of the process, the furnace and the furnace charge are first purified by baking and purging with inert gas. The furnace is then filled with argon by causing it to flow through the center tube 3. At the same time boron trichloride $BCl_3$ doping is introduced along with the argon, the gas flow being for instance at a rate of 6 cubic feet per hour with the concentration of $BCl_3$ by volume being about 15%. The temperature is increased to about 2600° C. over an interval of one hour, the argon plus boron trichloride flowing continuously. After 3 to 4 hours, the doping with boron trichloride is stopped and nitrogen is introduced along with the argon for about one hour more; the concentration of nitrogen in the argon may be from 0.1% to 10% by volume. The furnace is then allowed to cool and the crystals recovered.

Crystals of silicon carbide are formed in the originally empty crucible which was surrounded by the silicon carbide powder. These crystals can reach fairly large sizes, for instance ¼ inch plates. As a result of the way in which they were doped, they contain an inner region rich in boron which shows p-type conductivity, and an outer region rich in nitrogen which shows n-type conductivity. The n-type region is photoluminescent under 3650 A. and 2537 A. radiation; also under X-rays and cathode ray excitation. The luminescence of the crystals results from the presence of boron serving as an activator and nitrogen serving as a coactivator.

Elements similar to boron, that is group III elements, such as Al, Ga, In and elements similar to nitrogen, that is group V elements, namely P, As, Sb may also serve as activators and coactivators respectively. However, doping with N alone or B alone does not produce phosphors unless it so happens that the necessary complementary impurity was already present in the silicon carbide charge.

The growth of the crystals, as described, involves diffusion of the silicon carbide charge through the walls of the empty graphite cylinder and diffusion of the doping agents through the walls of the central graphite tube into the annular space between the central tube and the outer walls. It is to be noted that the diffusion of silicon carbide towards the center of the furnace is facilitated by the presence of a radial temperature gradient, that is by having the temperature higher outside, close to the heating elements, than in the center of the furnace. The central tube in conjunction with the gas flow through the center of the furnace has the following functions:

(1) It increases the temperature gradient in a controlled manner by conductive loss of heat to the gas flow and by radiant loss through the ends of tube 3 thus serving as a heat sink; the resulting temperature gradient favors the transfer of silicon carbide towards the center of the furnace;

(2) It effects a more rapid exchange of gases between the ambient (i.e. the gas flow) and the growth chamber; thereby it helps to carry away impurities which are more volatile than the silicon carbide itself, and which otherwise could remain as undesired impurities in the crystals, and it accelerates the exchange of doping agents between the ambient and the growth chamber.

According to the conditions of preparation, that is temperature, rate of flow of the gases, cooling rate, porosity of the graphite and purity of the starting materials, the silicon carbide crystals obtained show fluorescence at room temperature in a wide spectral region from green to deep red. Usually the orange-red color prevails.

X-ray analysis and optical absorption data have shown that the change in fluorescence color is, among other things, associated with changes in the structure of the silicon carbide crystals. Over 30 crystal modifications of SiC, usually referred to as polytypes, are known to exist. Different polytypes have different, but related, crystal structures, and usually different band-gaps. For instance hexagonal 6H—SiC has a band-gap of about 3.0 ev., while cubic 3C—SiC has a band-gap of about 2.3 ev. The 6H structure is stable at high temperature (say at about 2500° C. or above), while the 3C structure is stable at low temperatures (below about 2000° C. and down to room temperature). It appears that during the cooling off period of the high temperature furnace used for the preparation of the crystals, some transformation of high temperature SiC to low temperature SiC occurs. In order to stabilize the high temperature form of SiC obtained, the power was usually shut off completely after the furnace was operated at 2600° C. for a period of time long enough (some hours) to obtain properly doped crystals of large dimensions.

By the use of this technique it was possible to obtain batches of crystals which were mostly of the 6H type. As, however, the growth chamber has a finite size and different temperatures and cooling rates apply to different parts of the growth zone, usually some other crystal types, such as 4H—SiC (Hexagonal), 15R—SiC (rhombohedral) etc. are obtained along with the 6H—SiC crystals. Sometimes the same individual crystal displays different structures in different zones. Epitaxial growth of cubic SiC on hexagonal SiC is, for instance, a common occurrence. Using boron and nitrogen as doping agents the luminescence at room temperature was usually in the orange for 6H—SiC, in the green for 4H—SiC and in the red for structures intermediate between the 6H and the 3C structures. More specifically hexagonal 6H—SiC crystals (band-gap 3.0 ev.) emitted in the orange in a broad band peaking at 6100 A.; a 4H-polytype (band-gap 3.2 ev.) emitted in the green peaking at 5450 A.; and crystals with a band-gap below 3.0 ev. (possibly hexagonal crystals partly reverted to cubic) emitted in the red, at 6700 A. It should be realized that minor differences occur from crystal to crystal and the values quoted above are given only by way of example.

If the doping with boron and nitrogen is done in such a way as to alternate between the two kinds of doping impurity many times during the formation of the crystal, multiple junctions are obtained, e.g. p-n-p-n junctions which show different fluorescent regions separated by dimmer or dark regions.

The junctions are also electroluminescent and emit in the orange-red region with forward bias and in the blue-green region with reverse bias. When electric contacts are applied to the crystals, one contact being preferably transparent, the application of an A.C. field results in the emission of orange-red light at voltages as low as 2 to 3 volts.

What I claim as new and desire to rescure by Letters Patent of the United States is:

1. The method of preparing silicon carbide crystals which comprises providing a charge of silicon carbide as a lining within a carbon crucible completely surrounding an internal porous carbon vessel through the center of which extends a porous carbon channel, said internal vessel defining a condensation chamber around said channel, immersing said crucible in an inert gas and flowing the inert gas through said channel, applying heat around the crucible to raise the temperature to the point where silicon carbide sublimes, the flow of gas through said channel and the loss of heat through the ends thereof producing a radial temperature gradient favorable to the diffusion of silicon carbide through the wall of said internal vessel and condensation thereof within said chamber.

2. The method of preparing silicon carbide phosphors having room temperature emission which comprises providing a charge of silicon carbide as a lining within a carbon crucible completely surrounding an internal porous carbon vessel through the center of which extends a porous carbon pipe, said internal vessel and pipe together defining an annular condensation chamber, immersing said crucible in an inert gas and flowing the inert gas laden with a doping agent through said pipe, applying heat around the crucible to raise its temperature to the point where silicon carbide sublimes, the flow of gas through said pipe producing a radial temperature gradient favorable to the diffusion of silicon carbide through the wall of said internal vessel and condensation thereof in said annular chamber in the presence of said doping agent.

3. The method of preparing silicon carbide phosphors having room temperature emission which comprises providing a charge of silicon carbide as a lining within a carbon crucible completely surrounding an internal porous carbon vessel through the center of which extends a porous carbon pipe, said internal vessel and pipe together defining an annular condensation chamber, immersing said crucible in an inert gas and flowing the inert gas laden with a doping agent from Group V-A of the Periodic Table for n-type conductivity and from Group III-A of the Periodic Table for p-type conductivity through said pipe, applying heat around the crucible to raise its temperature to the point where silicon carbide sublimes, the flow of gas through said pipe and the loss of heat through the ends thereof producing a radial temperature gradient favorable to the diffusion of silicon carbide from the periphery inward through the wall of said internal vessel and condensation thereof in said annular chamber in the presence of doping agents diffused from the center outward through said pipe, thereby forming phosphors containing doping impurities causing luminescent properties.

References Cited by the Examiner

UNITED STATES PATENTS

| | | | |
|---|---|---|---|
| 2,854,364 | 9/1958 | Lely | 148—1.5 |
| 2,996,783 | 8/1961 | Mayer | 23—294 |

TOBIAS E. LEVOW, *Primary Examiner.*

MAURICE A. BRINDISI, *Examiner.*